March. 4, 1969
C. F. HLINKA
3,430,291
MACHINE FOR CONTINUOUSLY FORMING AN ELONGATED CLEATED
RUNNER OF PLASTIC MATERIAL
Filed Dec. 6, 1965
Sheet __1__ of 2
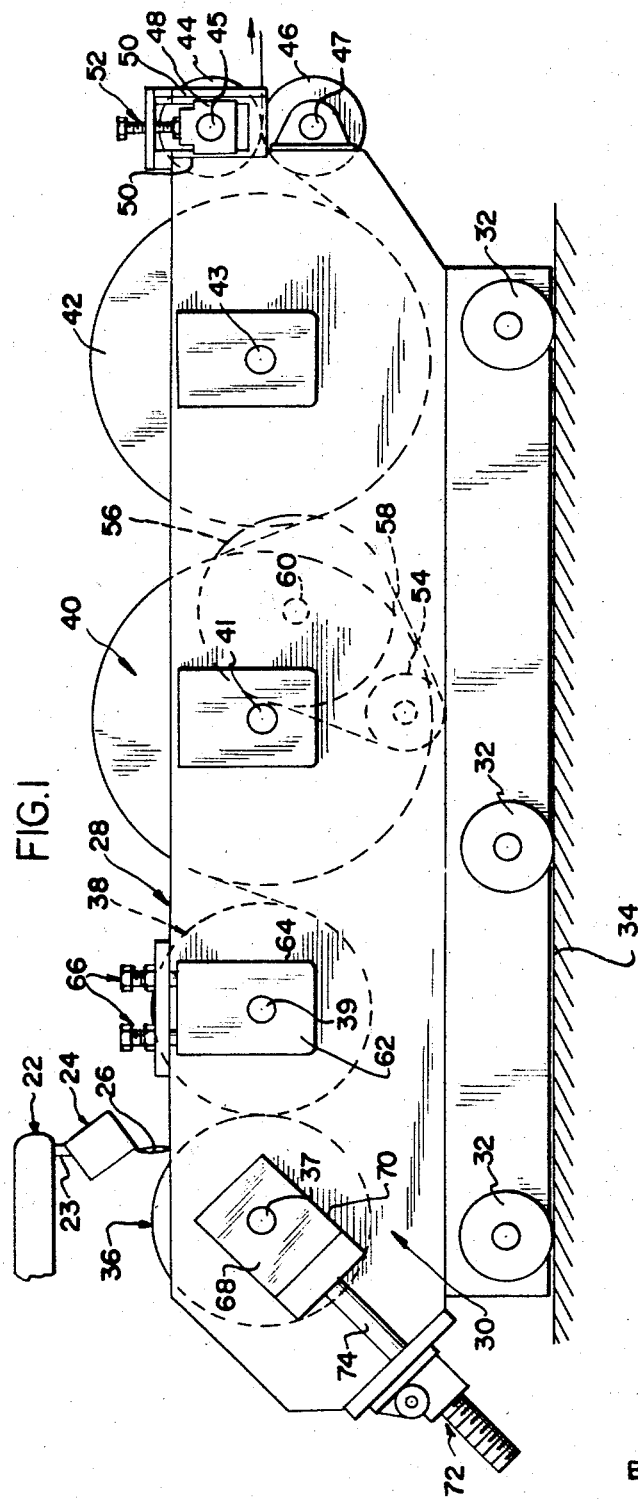
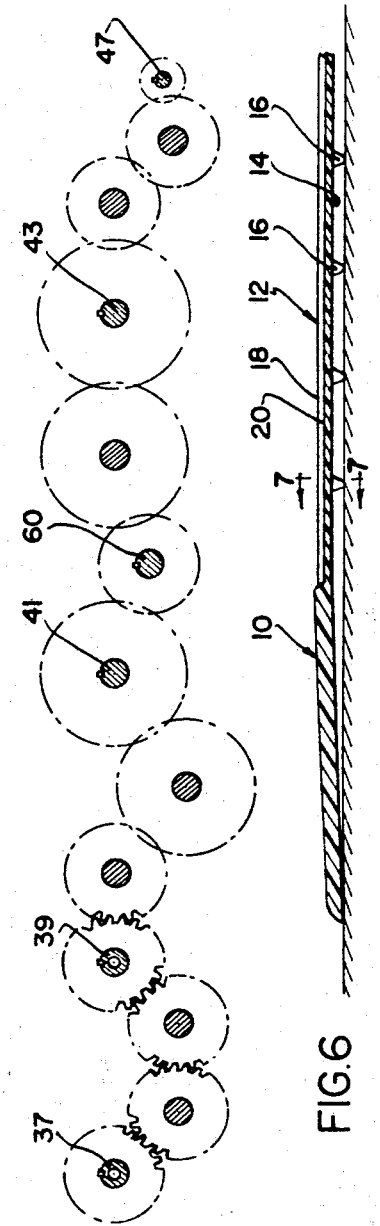
INVENTOR
CHARLES F. HLINKA
BY Bair, Freeman & Molinare
ATTORNEYS March. 4, 1969
C. F. HLINKA
3,430,291
MACHINE FOR CONTINUOUSLY FORMING AN ELONGATED CLEATED
RUNNER OF PLASTIC MATERIAL
Filed Dec. 6, 1965
Sheet 2 of 2
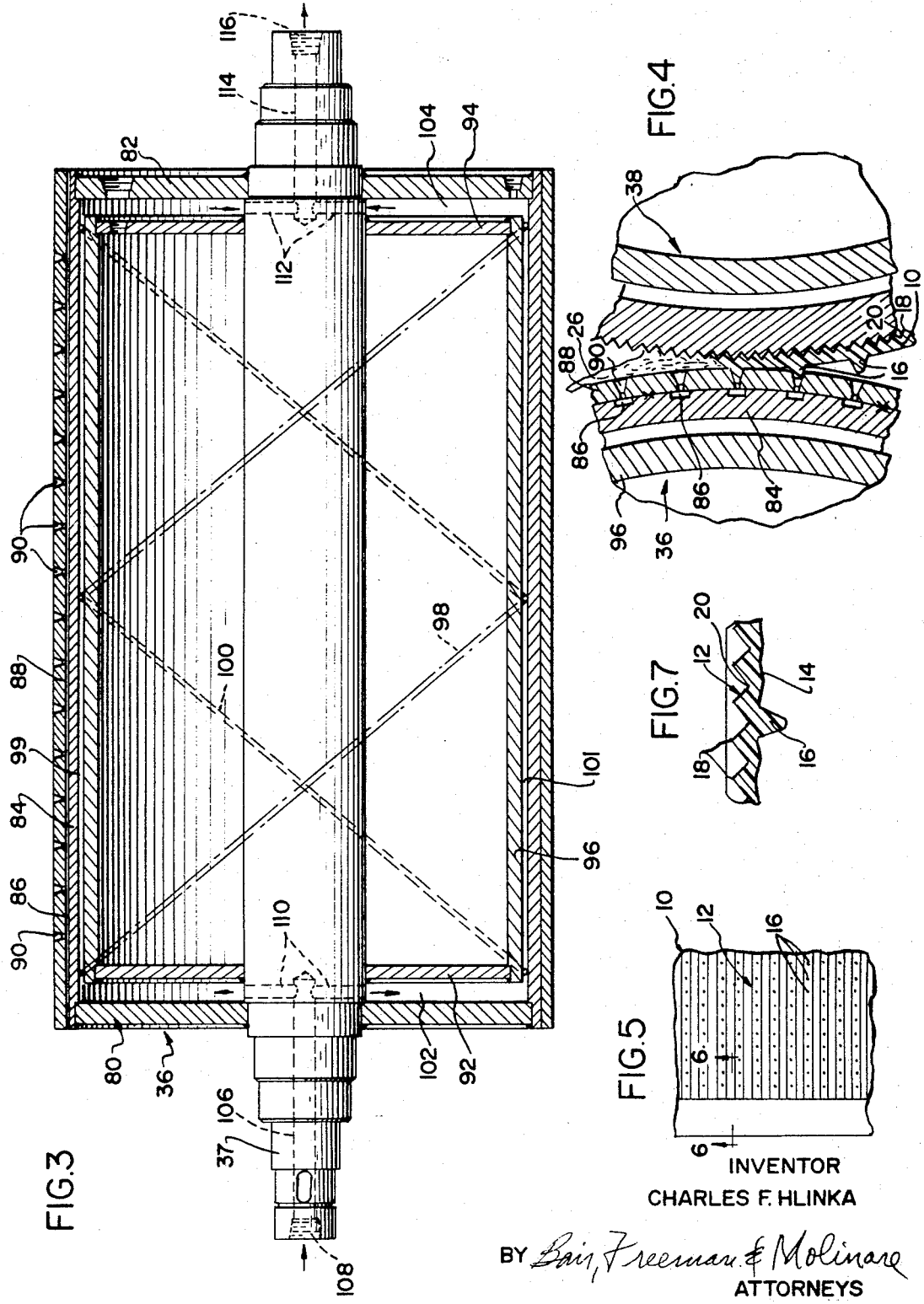
INVENTOR
CHARLES F. HLINKA
BY Bair, Freeman & Molinare
ATTORNEYS

United States Patent Office 3,430,291
Patented Mar. 4, 1969

3,430,291
MACHINE FOR CONTINUOUSLY FORMING AN ELONGATED CLEATED RUNNER OF PLASTIC MATERIAL
Charles F. Hlinka, Franklin Park, Ill., assignor to Tenex Corporation, a corporation of Illinois
Filed Dec. 6, 1965, Ser. No. 511,964
U.S. Cl. 18—10                8 Claims
Int. Cl. B29d 7/14

ABSTRACT OF THE DISCLOSURE

A processing machine for producing an elongated web of plastic material with a pattern impressed into the top surface of the web and with integral elongated cleats extruded transversely from the lower surface of the web is provided by a pair of spaced rollers that calender the web material to a desired thickness, impress the pattern in the top surface, and extrude the elongated cleats from the web material. The roller in which extrusion is effected is defined by three concentric shells, the outermost having recesses for defining the extruded projections and the other two defining a jacket through which heated water is circulated for maintaining an elevated temperature. The innermost ends of the extrusion recesses are vented to effect accurate extrusions and the exterior surface of the middle shell is shaped to provide both heat transfer to the outer shell and vent channels for the extrusion recesses. The other roller is maintained at a lower temperature and has a shallower impression pattern defined on its surface.

---

This invention relates to a machine for forming an elongated runner of plastic material with cleats.

Machines are known for forming plastic material into elongated webs and for defining, or embossing, by pressure, a repeated pattern in a surface of the web to a relatively shallow depth.

An elongated runner of plastic material, such as vinyl, is a desirable product for use in homes as a protective overlay for expensive carpeting. An undesirable feature in such a product heretofore has been the tendency of the runner to slide relative to the surface of the carpet. While it has been suggested that cleats on the underside of such runners would provide engagement with the carpet to prevent such sliding, no process has heretofore been known for economically producing an endless web or runner with well defined, elongated cleats thereon that extend transverse to the plane of the web.

While the processes of embossing or extruding logically suggest themselves, it is found that such processes fail to provide an efficient method of forming well-defined and sufficiently elongated cleats of the type necessary to effect the desired engagement with the carpet.

An object of this invention is to provide a machine for economically forming plastic material into an endless web having defined on a side thereof a continuous pattern of sharply defined and elongated cleats extending transversely therefrom.

In the invention herein a pair of calendering, or pressure, surfaces are provided for defining the basic thickness of the plastic web, with one of the pressure surfaces being provided with elongated extrusion bores therein into which heated plastic of the web in molten form is forced, and with said bores being vented at their inner ends to insure elongated extrusion of the plastic without deformation of the extrusions by air being trapped in the recesses into which the extruded material enters. The process is desirably augmented by maintaining the surface with the extrusion bores therein at a relatively greater temperature than the temperature of the opposed pressure surface which may also, at the lower temperature, be used to emboss a pattern in the web of plastic.

Thus, still another object of this invention is to provide a machine for achieving the ends as hereinabove set forth, so as to achieve the economic and continuous production of an improved plastic runner with sharply defined and elongated cleats extending transversely from a surface of the runner.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which FIG. 1 is a schematic side elevational view of a machine for producing an improved runner of plastic as hereinabove defined and for practicing the inventive process.

FIG. 2 is a schematic side elevational view of the gear train of the machine shown in FIG. 1.

FIG. 3 is an axial cross-sectional view of one of the embossing rollers of the machine shown in FIG. 1 and which embodies one of the inventions disclosed herein.

FIG. 4 is a fragmentary cross-sectional view taken at the bite of the calendering or pressure rollers.

FIG. 5 is a fragmentary plan view of a portion of a runner produced by practice and use of the inventions disclosed herein.

FIG. 6 is an enlarged fragmentary cross-sectional view of the runner taken on line 6—6 of FIG. 5.

FIG. 7 is a further enlarged fragmentary cross-sectional view taken on line 7—7 of FIG. 6.

Referring now to the drawings, there is shown in FIGS. 5–7 a segment of a runner of vinyl plastic that has been constructed by the machine and process of this invention. The runner includes a web 10, having a patterned upper surface 12, and a smooth lower surface 14, from which project a plurality of elongated cleats 16. Such a runner as shown in FIG. 5 would be, for example, 27½ inches wide and have a maximum thickness of between $\frac{3}{32}$ to $\frac{1}{8}$ of an inch, while the length of the elongated cleat 16 is greater than the said maximum thickness of the runner and is in the range of about $\frac{3}{16}$ of an inch. The upper surface 12 has a relatively shallow, embossed, pattern therein in the form of transverse serrations which define alternate ridges 18 and valleys 20.

In the production of the vinyl runner shown in FIG. 5, a machine to produce such a runner is shown in FIG. 1 as including means for supplying the vinyl in molten form and includes a header, generally indicated at 22, from which vinyl, or other plastic, in molten form is fed through tube 23 to a sheeting header 24, which operates to spread out the molten material approximately to the width of the runner, and from whence there is discharged a wide web 26 that is in fairly coherent but soft, and moldable or extrudable, form. The web 26 enters a machine that is generally indicated at 28 and which is composed of a frame 30 supported on a plurality of rollers 32 to make such machine movable or adjustable on a supporting floor or tracks 34.

Carried on the frame 30 is a first pressure roller generally indicated at 36, that is rotatably mounted on a shaft 37, and an adjacent second pressure roller 38 rotatably mounted on a shaft 39. The molten or soft web 26 is caused to pass between said rollers 36 and 38 to be formed and properly surfaced. After the web 26 passes between the rollers 36 and 38, it is trained over and against the underside of roller 38 and then passes over a first cooling roller 40 that is rotatably mounted on a shaft 41, and thence over a second cooling roller 42 rotatably mounted on a shaft 43, until the web advances between a pair of web-advancing rollers, including an idling roller 44 and a driven-roller 46, for effecting discharge to another station at which some additional action may be taken on the formed web or runner.

The web-advancing rollers 44 and 46 are relatively adjustable to each other, to accommodate webs of various thicknesses therebetween, and such adjustment is in the form of the roller 44 being mounted on a shaft 45 that is carried at its ends in journal blocks 48 which are slidably mounted in tracks 50 on opposite sides of the frame 30. A screw adjustment means at 52 provides for advancing the journal means 48 toward and away from the roller 46. The entire apparatus is driven through a drive source that includes a drive sprocket 54 and a driven sprocket 56 which are interconnected by a chain drive 58, and with a driven shaft 60 connected to and rotatable with sprocket 56.

The second pressure roller 38 is mounted in frame 30 by means of journal blocks 62 located in slideways 64 on opposite sides of frame 30, each of said journal blocks supporting one end of shaft 39. Screw means 66 are provided to permit of removal of roller 38 and of journal blocks 62 from slideways 64 for purposes of servicing. The first roller 36 is adjustable on an incline, relative to the second roller 38, by means of a pair of journal blocks 68 which support the ends of shaft 37 and which are slidably mounted in inclined slideways 70 defined in frame 30. Adjustment is effected by means of screw adjustments 72 which include thrust shafts 74 that extend into engagement with the slidable journal blocks 68.

In the process for which this machine is used, the molten plastic material, in the form of web 26, is fed into and longitudinally advanced through the machine, with the web 26 first moving into engagement with an upper portion of the first pressure roller 36 as seen in FIG. 1, and then the web moves along such pressure roller toward the bite between the two pressure rollers 36 and 38 where the spacing between the two pressure rollers serves as a calendering means for controlling the thickness of the web that passes through and beyond the said bite between the rollers. Because of the closeness of the spacing of rollers 36 and 38, a slight bank of molten material is defined upstream, or above, the bite as is best seen in FIG. 4. The web-like supply of plastic material then moves through and past the forming station defined at the bite between rollers 36 and 38. At said forming station, the supply of molten plastic is forced against an endless cleat former defined on and by the outer surface of roller 36, so as to force some of the material from the web 26 in a direction transverse to the direction of movement of both the web 26 and the outer surface of roller 36 so as to extrude portions of the plastic from the underside of the web in a direction transverse to the direction of longitudinal movement of the web, and thereby forming the transverse longitudinal cleats 16 on the underside of the web or runner.

In the forming of the cleats, it has been found that it is essential to vent the recesses or passageways into which the material is extruded to define the cleats so as to avoid malformation of the cleats, and in this invention that step is accomplished simultaneously with the extrusion, so that the cleats 16 are formed without the development of any back pressure in the cleat-forming recesses that may tend to inhibit proper and full extrusion of the cleats. At the same time the cleats are being formed by the roller 36, the upper side of the web 26 is being acted upon by the die means 38a defined in the surface of the second extrusion roller 38, and that die is selected of any desirable pattern so as to emboss the desired pattern in the surface of the web.

In the process of forming the endless runner with cleats thereon, the first, or extruding, roller 36 is maintained at a relatively elevated temperature of about 140° F. so that the formation of cleats by extrusion is effected at that elevated temperautre while the second, or embossing, roller 38 is maintained at a relatively cooler temperature of about 90° F., so that the embossing is effected at a relatively lower temperature.

The machine for successfully practicing the foregoing process includes an improved first pressure roller 36, the details of construction of which are best seen in FIGS. 3 and 4. In FIGS. 3 and 4, the roller, generally indicated at 36, is shown with its shaft 37, and consists of an outer liquid-tight cylinder on shaft 37 that includes spaced end plates 80 and 82 welded to shaft 37 and a cylindrical outer jacket wall 84 welded to the end plates. The exterior periphery of outer wall 84 is shaped to provide thereon a plurality of equally spaced elongated grooves 86 that are depressed inwardly of the exterior periphery of wall 84 and which run substantially parallel to the axis of shaft 37. The grooves may be formed in the cylindrical wall 84 in any appropriate manner, such as by milling or the like.

The outer cylinder also carries thereon a pressure sleeve 88. The pressure sleeve 88 is in the form of a metal tube that may be heated to expand so that it may then be slipped over the cylindrical wall 84. Thereafter, cooling the pressure sleeve 88 will cause it to shrink fit onto the cylindrical wall 84. Spot webs may be provided as necessary between the pressure sleeve 88 and the cylindrical wall 84 to operate to lock the two parts together. The pressure sleeve 88 is then bored to provide a plurality of extrusion-defining recesses or bores 90 which are shaped to the desired shape for forming the cleats 16. The cleat-forming bores 90 are located so that the inner radial ends thereof communicate with the grooves 86. Since the grooves 86 extend across the entire width of the cylindrical wall 84, it will be seen that each of the cleat-forming recesses 90 is vented to atmosphere at its inner end through the grooves 86 and laterally of the end plates 80 and 82 of the outer cylinder.

The pressure roller 36 also carries thereon an inner cylinder consisting of spaced end plates 92 and 94 welded to shaft 37, and a cylindrical wall 96 carried on said end plates and welded thereto to define a liquid-tight inner cylinder. The liquid-tight inner and outer cylinders whose ends and cylindrical walls are spaced from each other define a jacketed roller 36.

There is formed on the cylindrical inner jack wall 96 a plurality of helical beads or ribs 98 and 100, which lie diametrically of each other and which are of a size to substantially extend across the space defined between the outer and inner jacket walls 84 and 96. The helical beads 98 and 100 cooperate with the jacket walls 84 and 96 to define a pair of flow passageways 99 and 101 of generally helical shape. These helical flow passageways 99 and 101 communicate at their ends respectiveliy with end spaces 102 and 104, the space 102 being defined between the adjacent end plates 80 and 92 and the space 104 being defined between the adjacent end plates 82 and 94. An inlet axial flow passage 106 with an entry 108 at one end is defined at one end in shaft 37. The passage 106 communicates at its other end with a pair of transverse bores 110 which are directed in opposite directions with the entry space 102. The opposite end of shaft 37 is provided with diametrical bores 112 which communicate at one end with an outlet space 104 and then connect to an outlet axial flow passage 114 that terminates in an outlet 116.

It will be understood that by pumping heated liquid, such as hot water, through entry 108, such heated water is caused to pass through helical flow passageways 99 and 101 between the walls or jacket of the roller 36, operating thereby to heat the outer portion of the pressure roller 36 and maintaing the extrusion sleeve 88 at a pre-determined temperature of about 140° F., the spent water being discharged at 116. By carefully controlling the temperature of the water passing through the jacketed roller 36, the temperature of the roller 36 may be accurately controlled. Although not shown, it will be understood that the second roller 38 is similarly constructed and jacketed for its temperature control to about 90° F., and by this means it is possible to effect accurate, separate and independent temperature control for each of the rollers 36 and 38.

The gear train shown in FIG. 2 operates to cause the various rollers to move synchronously and at a selected desired speed, so as to have the web 26 advance at the speed desired. After the web 26 passes between the first and second presesure rollers 36 and 38, it emerges in its extruded form but still at an elevated temperature and somewhat soft. Accordingly, to cool the finished runner, the web is caused to first pass over the portion of the underside of roller 38 which is a the lower temperature of about 90° F., and then the web passes over cooling rollers 40 and 42 which may also be jacketed in the manner described as relates to roller 36, and will be cooled by the refrigerated water or other liquid at a reduced temperature. In the passage of the web over the rollers 40 and 42, it is cooled to a desired temperature after which the web passes between the advancing rollers 44–46 to the next station where the runner may be treated in some other fashion, or trimmed and stored.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A device for forming a longitudinally moving, plastic web with relatively elongated projections thereon which extend longitudinally in directions from said web transverse to the direction of movement of the web, said device comprising, in combination, a forming surface movable synchronously with the longitudinally moving web and against which the web is temporarily held, the forming surface being an endless sleeve carried on a rotating support, the rotating support being a cylindrical body with a plurality of axially extending and peripherally spaced ribs on the periphery of said body to define an axially extending venting channel between each pair of spaced ribs, the endless sleeve being carried on said ribs, a plurality of elongated bores in the forming surface and through the sleeve and each extending transverse to the direction of movement of the web and through the outer end of which material of the web is forced to be extruded, and means communicating in inner ends of the bores with the axially extending venting channels.

2. In a process machine that utilizes two spaced movable members that cooperate with each other and with a longitudinally moving web of material in extrudable condition to both impose a desired thickness on the processed web and to pressurize the web material to extrude from and form on the processed web relatively elongated extruded projections that extend longitudinally outwardly of the web in directions transverse to the direction of movement of the web, the improvement comprising, in combination, one of said movable members having defined therein a pattern of elongated recesses shaped and arranged to receive therein the material extruded from the web and to define thereby the relativly elongated extruded projections, venting means communicating with the innermost ends of said pattern of recesses to vent any air that is trapped in said recesses, and the said one of the movable members including a pair of concentric cylinders having a plurality of spaced regions of contact therebetween which provide for transfer of heat between the pair of cylinders and which also provide portions of venting channels defined between adjacent pairs of spaced regions of contact.

3. In a processing machine that utilizes two spaced movable members that cooperate with each other and with a longitudinally moving web of material in extrudable condition to both impose a desired thickness on the processed web and to pressurize the web material to extrude from and form on the processed web relatively elongated extruded projections that extend longitudinally outwardly of the web in directions transverse to the direction of movement of the web, the improvement comprising, in combination, one of said movable members having defined therein a pattern of elongated recesses shaped and arranged to receive therein the material extruded from the web and to define thereby the relatively elongated extruded projections, the said one of the movable members including a sleeve-like body with a cylindrical exterior periphery and having said pattern of recesses defined in said sleeve-like body, support means engaging the inner periphery of said sleeve-like body, the periphery of said support member being shaped to define portions of venting channels, the inner periphery of said sleeve-like body cooperating with said support means to help define the venting channels, and means communicating the said pattern of recesses in the sleeve-like body with said venting channels to vent any air that is tripped in said recesses.

4. A machine as in claim 2, including means connected to said movable with the one movable member for heating and maintaining the temperature of said one movable member.

5. A machine as in claim 2, including means connected to and movable with the one movable member for heating and maintaining the temperature of the one movable member, and means connected to and movable with the other movable member for maintaining the other movable member at a temperature less than the temperature of the one movable member.

6. A machine as in claim 2, including jacket means defined in part by the inner one of said pair of concentric cylinders for heating said inner cylinder, and thereby the outer cylinder, with temperature controlled water.

7. A machine as in claim 2, wherein the outer one of said pair of cylinders is shrink-fit onto, and thereby grips tightly, the inner one of said pair of cylinders to provide for excellent heat transfer contact between the cylinders.

8. A machine as in claim 6, wherein the jacket means includes two concentric cylinders, portions of which are spaced to define a liquid-receiving chamber therebetween, and rib means in said liquid-receiving chamber defining flow passageways for directing movement of liquid through said chamber.

References Cited

UNITED STATES PATENTS

| 1,132,250 | 3/1915  | Finlayson. |
| 1,445,990 | 2/1923  | Bourn _____ 18—2 |
| 1,625,396 | 4/1927  | Roberts. |
| 2,651,810 | 9/1953  | Snyder. |
| 2,752,635 | 7/1956  | Miller. |
| 2,756,460 | 7/1956  | Heintz. |
| 2,782,461 | 2/1957  | Esslinger. |
| 3,007,207 | 11/1961 | Salhofter _____ 18—2 XR |
| 3,264,682 | 8/1966  | Freeman _____ 18—2 |
| 3,339,228 | 9/1967  | Seanor et al. _____ 18—2 |
| 1,988,787 | 1/1935  | Fowler _____ 18—10 X |
| 3,072,961 | 1/1963  | Gilbert _____ 18—10 |
| 3,089,191 | 5/1963  | Conrad _____ 18—21 |
| 3,121,913 | 2/1964  | Hagmann et al. _____ 18—10 |
| 3,311,692 | 3/1967  | Baird _____ 18—10 |

WILLIAM J. STEPHENSON, *Primary Examiner.*

U.S. Cl. X.R.

18—21

UNITED STATES PATENT OFFICE
CERTIFICATE OF CORRECTION

Patent No. 3,430,291                                                          March 4, 1969

Charles F. Hlinka

It is certified that error appears in the above identified patent and that said Letters Patent are hereby corrected as shown below:

Column 4, line 42, "jack" should read -- jacket --. Column 5, line 47, "in" should read -- the --. Column 6, line 23, "tripped" should read -- trapped --; line 25, "said" should read -- and --; line 38, "temperature controlled" should read -- temperature-controlled --.

Signed and sealed this 31st day of March 1970.

(SEAL)
Attest:

Edward M. Fletcher, Jr.                             WILLIAM E. SCHUYLER, JR.

Attesting Officer                                                 Commissioner of Patents